May 24, 1966  G. E. VON GAL, JR  3,252,559
ARTICLE TRANSFER DEVICE

Filed March 13, 1962  5 Sheets-Sheet 1

INVENTOR.
George E. von Gal, Jr.
BY
ATTORNEY

May 24, 1966   G. E. VON GAL, JR   3,252,559
ARTICLE TRANSFER DEVICE
Filed March 13, 1962   5 Sheets-Sheet 2
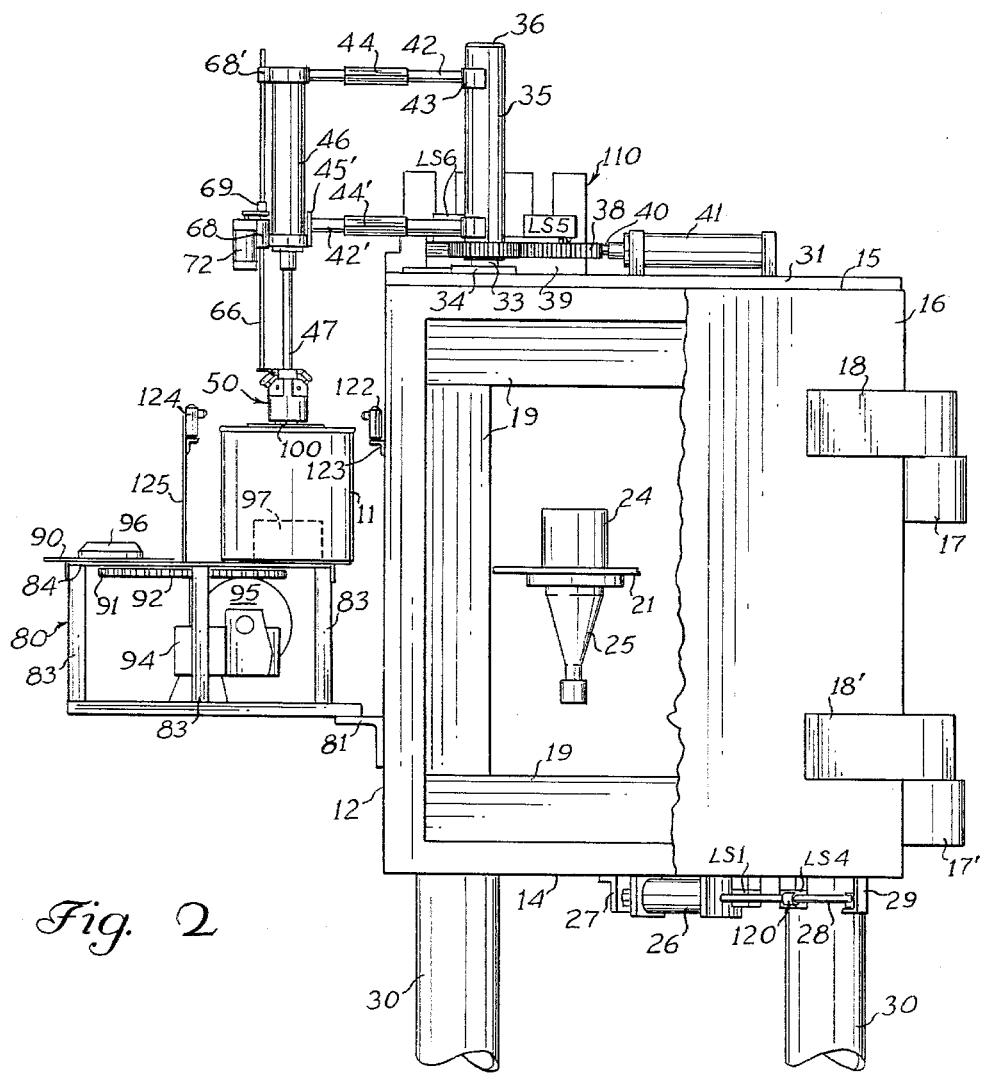
Fig. 2
INVENTOR.
George E. vonGal, Jr.
BY
ATTORNEY

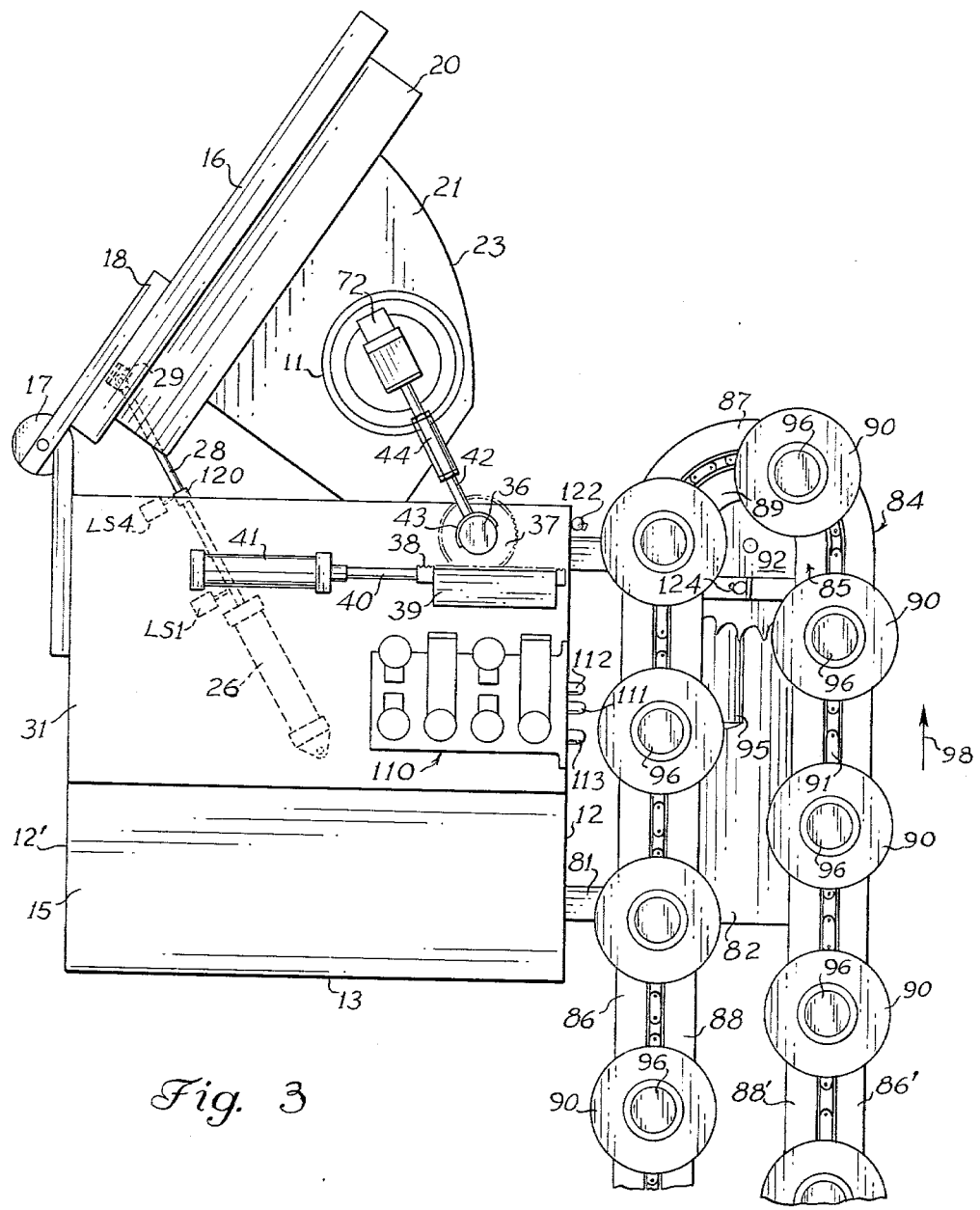
Fig. 3
INVENTOR.
George E. vonGal, Jr.
ATTORNEY

May 24, 1966  G. E. VON GAL, JR  3,252,559
ARTICLE TRANSFER DEVICE
Filed March 13, 1962  5 Sheets-Sheet 4
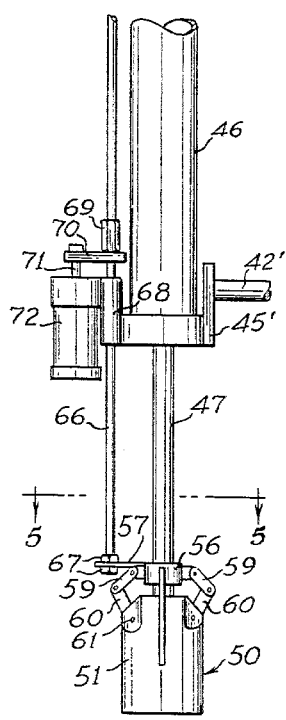
Fig. 4
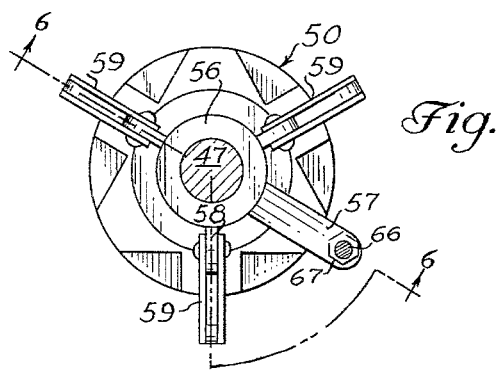
Fig. 5
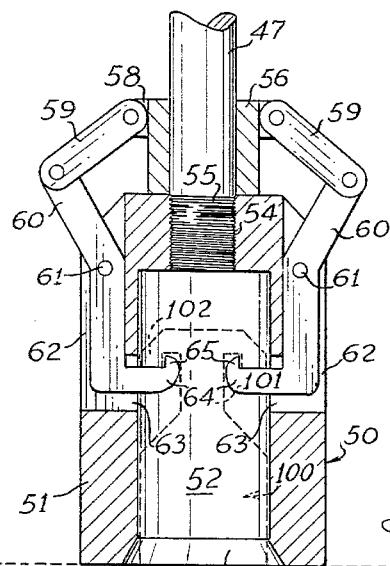
Fig. 6
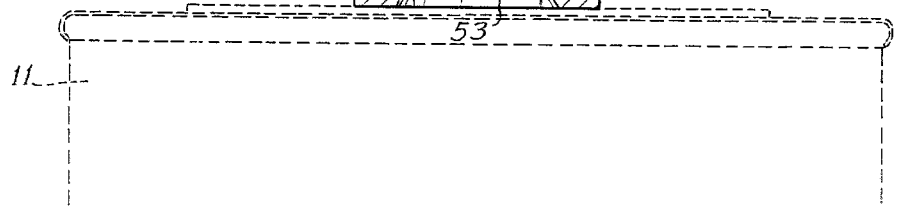
INVENTOR.
George E. vonGal, Jr.
BY
ATTORNEY INVENTOR.
George E. von Gal, Jr.
BY
ATTORNEY

United States Patent Office 3,252,559
Patented May 24, 1966

3,252,559
ARTICLE TRANSFER DEVICE
George E. Von Gal, Jr., 3048 Thomas Ave.,
Montgomery, Ala.
Filed Mar. 13, 1962, Ser. No. 179,338
7 Claims. (Cl. 198—20)

This invention relates to an article transfer device and is more particularly concerned with a combination conveyor system and transfer arm by which successive articles are transferred from the conveyor system to an analyzing zone wherein an operation takes place and, thereafter, the transfer arm returns the article to the conveyor system.

With the advent of widespread use of radioactive material, it has become increasingly necessary for objects or articles to be handled remotely, providing as much shielding as is practical to the object during the handling of the same. In certain operations, it is desirable to deposit closed shield beakers successively and automatically in a shielded vault, so that a probe within the vault may automatically analyze the contents of each beaker.

Briefly, to provide such an arrangement, I have devised a mechanism by which the shielded beakers, or other articles for that matter, are successively deposited over such a probe and wherein the vault is opened and closed during the operation so that one beaker may be removed from the vault and a subsequent beaker deposited therein.

In general terms, the present invention includes a continuous conveyor mechanism which successively positions the beakers or articles in a pick-up zone where, during each cycle, a pivotally mounted pick-up arm moves down and automatically engages the beaker, lifts the same from the conveyor and carries the beaker to a receiving zone. A hinged door on a housing or vault is so synchronized with the operation of the pick-up arm that it positions a probe in the receiving zone, so as to receive the beaker carried by the pick-up arm. Thereafter, the door is automatically closed so that the beaker, together with the probe, is enclosed within the vault. After an analyzing operation by the probe, the door is automatically opened, the pick-up arm then reengages and lifts the beaker from the probe, returns it to the conveyor and the mechanism repeats the cycle, whereby the next successive beaker is positioned in the pick-up zone, transferred to the receiving zone, analyzed and returned to the pick-up zone.

Accordingly, it is an object of the present invention to provide an article transfer device which will successively feed and remove objects from a predetermined zone.

Another object of the present invention is to provide an article transfer device which will automatically and successively transfer articles from a conveyor line to a predetermined zone and from the predetermined zone back to the conveyor line.

Another object of the present invention is to provide an article transfer device which is inexpensive to manufacture, durable in structure and efficient in operation.

Another object of the present invention is to provide an article transfer device which is fully automatic and in which each operation of the device may be remotely controlled in the event that the device does not function properly or in the event that the sequence of operation is desired to be altered.

Other objects, features and advantages of the present invention will become apparent from the following description when taken in conjunction with the accompanying drawings wherein like characters of reference designate corresponding parts throughout the several views, and wherein:

FIG. 2 is a partially broken end view of the device shown in FIG. 1, the pick-up assembly being in its depositing position, depositing the article or beaker over the probe.

FIG. 3 is a plan view of the device shown in FIGS. 1 and 2, the pickup assembly being in the positions shown in FIG. 2.

FIG. 4 is an enlarged fragmentary side elevational view of a portion of the pick-up assembly.

FIG. 5 is a cross sectional view taken substantially along line 5—5 in FIG. 4.

FIG. 6 is a cross sectional view taken substantially along line 6—6 in FIG. 5.

Figure 1:
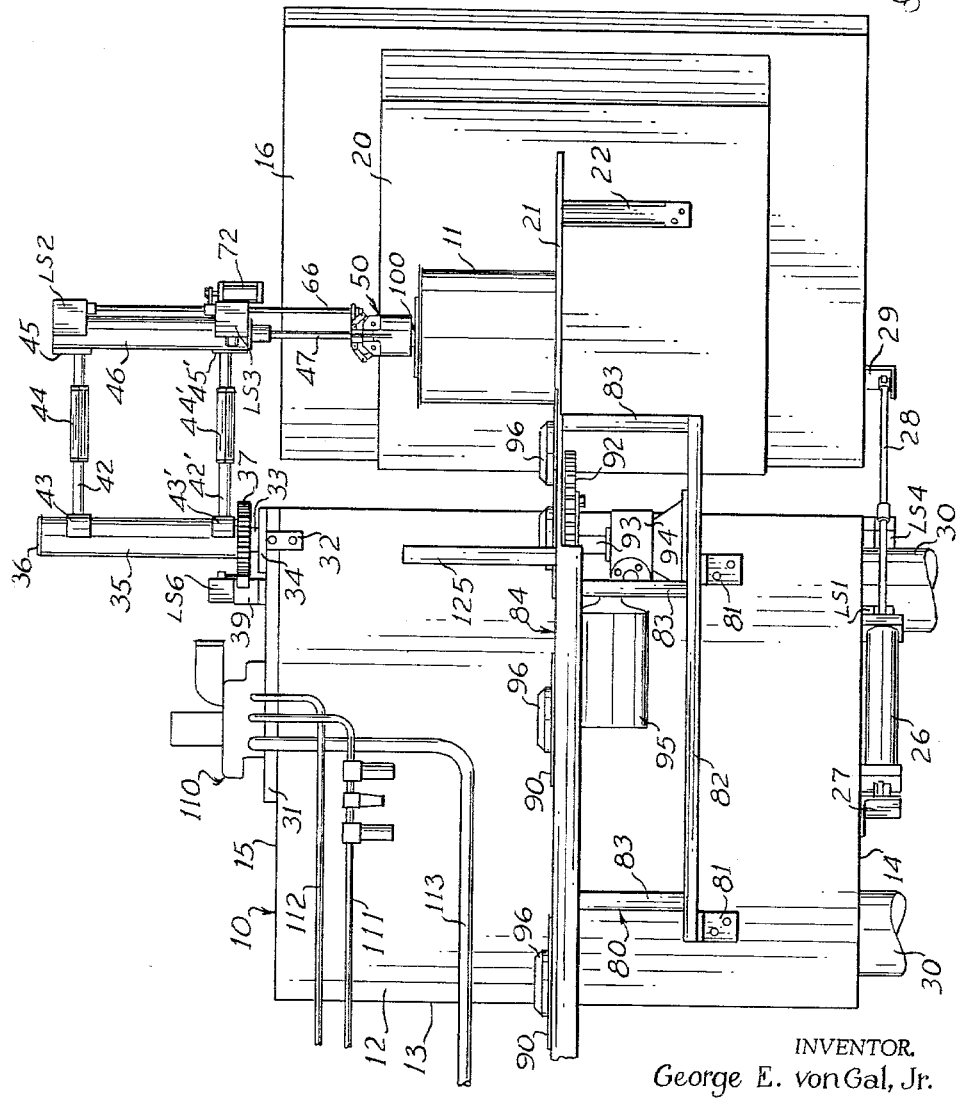
FIG. 1 is a fragmentary side elevational view of a device constructed in accordance with the present invention, the pick-up arm being shown in its pick-up assembly position for engaging one of the articles or beakers.

Referring now in detail to the embodiment shown for the purpose of illustrating the present invention, it being understood that in its broader aspects the present invention is not limited by exact details herein depicted, numeral 10 denotes generally a vault, housing or closure member, in which the beakers 11 are successively placed for analysis. The housing 10 includes a pair of opposed sides 12, 12', a back 13, a bottom 14 and a top 15. It is, therefore, seen that the housing or closure member 10 is open at its front end for receiving a rectangular door 16 which is hingedly carried by the front edge of side 12' for pivoting about a vertical axis. For carrying door 16, the side 12' is provided with a pair of hinge elements 17, 17' in vertical alignment along the outer edge, while the edge of door 16 is provided with vertically aligned hinge elements 18, 18' which are received by the hinge elements 17, 17', respectively.

As is usual, the housing 10 is provided with shielding material 19 around its inner walls, the shielding material being preferably lead or some other dense material which arrests or retards the gamma rays. Likewise, the door 16 is provided along its inner surface with shielding material 20, the shielding material 20 being adapted to be received in closely fitted relationship to the shielding material 19, when door 16 is closed. Thus, the shielding material 20 is centrally located on the inner surface of door 16, the edges of the shielding material 20 being spaced inwardly from the edges of door 16.

While, in the drawings, I have illustrated the housing or closure member 10 as being essentially rectangular, i.e. square, it will be understood that sugstantially any closure member of proper dimensions and having a hinged door which is pivoted along a vertical axis is suitable for use in the present invention.

Protruding from the central portion of the shielding material 20 on door 16 is a horizontally disposed platform 21 which is supported by brackets 22. The outer side edge 23 of platform 21 is curved so that the platform 21 may fit within the housing 10 as the door 16 is closed.

Mounted centrally on the platform 21 is an upstanding probe 24 which is connected to a radiation analyzer 25 suspended from the lower surface of the platform 21. Appropriate wires (not shown) are connected to the radiation analyzer 25 and may be connected to suitable computers or data analyzer mechanism (not shown) by which the substance within each beaker 11 is analyzed.

The door 16 is opened and closed, when desired, by means of a hydraulic door actuating means, such as cylinder 26, which is pivotally supported by one end from a bracket 27, the bracket 27 being mounted on the bottom 14 of housing 10. A piston rod 28 protrudes from the other end of cylinder 26 and is pivotally connected to a pivot arm 29 extending downwardly from the bottom of door 16. By extending the piston rod 28 the door 16 is opened, and by retracting the rod 28 the door is closed. Suitable legs 30 support the housing 10 in a horizontal position.

Along the upper surface of top 15 is a pick-up assembly mounting plate 31, the mounting plate 31 being secured in place by means such as flanges 32 which are secured to the sides 12, 12'. The pick-up assembly includes the forward edge portion of mounting plate 31, adjacent side 12, an upstanding cylindrical stub shaft or standard 33 carried by a supporting block 34 on plate 31. A rotatable sleeve 35 is received on standard 33, the sleeve 35 being provided with a cap 36 which limits the downward movement of the sleeve 35 so that the lower end of sleeve 35 terminates above the mounting block 34. At the lower end of sleeve 35 there is fixed a pinion 37 which meshes with a rack 38, riding in a slide block 39. The slide block 39 and the rack 38 extend transversely of the housing 10, the slide block 39 being mounted on platform 31. The inner end of rack 38 is connected to the outer end of a piston rod 40 carried by a hydraulic cylinder 41 mounted on platform 31.

A pair of horizontally disposed, vertically spaced arms 42, 42' protrudes from mounting blocks 43, 43' fixed to sleeve 35. The arms 42, 42' are respectively provided with turn-buckles 44, 44' which vary the effective length of each arm, as desired. The outer ends of arms 42, 42' are provided with supporting brackets 45, 45' which support therebetween a vertically disposed hydraulic pick-up cylinder 46. A piston rod 47 protrudes downwardly from the cylinder 46 and is provided, at its lower end, with a lifting head, denoted generally by numeral 50.

As best seen in FIGS. 4, 5 and 6, the head 50 includes a bell shaped body 51 which is essentially cylindrical in shape, having a downwardly opening central or axial bore 52 which is belled out in its lower portion 53. The upper end of body 51 is closed, there being provided a central opening with internal threads 54 which receive the external threads 55 on the end of rod 47. Thus, the end of rod 47 carries the body 51.

Around the rod 47 is a slidable collar 56 provided with an outwardly extending actuator arm 57. The collar 56 also has a plurality of radially spaced outwardly extending tabs 58 which pivotally carry a plurality of link arms 59. The link arms 59 normally extend downwardly and outwardly, their outer ends being respectively pivotally connected to the upwardly and outwardly extending upper legs of a plurality of dog-leg type levers 60. As best seen in FIG. 6, the central portions of levers 60 are pivotally carried by transverse pivot pins 61 in body 51, the lower legs of the levers 60 riding in vertical slots 62 in body 51. In more detail, the vertical slots 62 are disposed radially in the upper and central portions of the body 51. The lower ends of slots 62 communicate with central opening 52, through which the inwardly projecting carrying arms or hooks 64 on the ends of the lower legs of levers 60 respectively extend. The inner ends of hooks 64 have upturned fingers 65.

It is now seen that the upper legs of levers 60 and the link arms 59 form cooperating toggle members or joints which are actuated by the collar 56. When the collar 56 is in its down position, as shown in FIG. 6, the link arms 59 urge the upper legs of levers 60 outwardly, whereby the hooks 64 on the lower legs of levers 60 are urged inwardly into their engaging position. On the other hand, when the collar 56 is urged upwardly, the link arms 59 pull the upper legs of levers 60 inwardly and thereby retract the hooks 64, through the openings 63, for the purpose of releasing the beaker 11, as will be more fully described hereinafter.

For moving the collar 56 to a releasing position, the actuating arm 57 is connected to an actuating shaft 66, the shaft 66 extending upwardly therefrom, essentially parallel to the piston rod 47. As will be seen in FIG. 4, nuts 67 connect the lower end of rod 66 to arm 57. The shaft 66 is journaled for free slidable movement, axially, by means of a pair of journal blocks 68, 68' at the ends of cylinder 46. Thus, normally the shaft 66 is free to move with rod 47.

Between the journal blocks 68, 68', the rod 66 is provided with a lug 69 which is adapted to be engaged by a horizontally disposed arm 70 slidably mounted by one end on shaft 66 between the lower block 68 and lug 69. The other end of arm 70 is connected to an upstanding piston rod 71 carried by a release cylinder 72 mounted on the lower block 68. When piston rod 47 is extended and cylinder 72 is actuated, the piston rod 71 is raised, thereby raising arm 70 into engagement with lug 69. The raising of arm 70 raises lug 69 and thereby raises shaft 66 to raise, via arm 57, the collar 56. Therefore, when cylinder 72 is actuated to extend piston 71, the collar 65 is actuated to withdraw the hooks 64 for releasing the beaker 11.

As best seen in FIGS. 1, 2 and 3, there is a conveyor mounted on side 12 of housing 10. In more detail, the conveyor includes a conveyor frame denoted generally by numeral 80. In more detail, the frame 80 includes a platform 82 which is disposed horizontally and supported from side 12 by brackets 81. A plurality of upstanding struts 83, mounted by their lower ends on platform 82, support a pair of tracks 84 and 85 in a single plane above and parallel to the plane of platform 82. The outer track 84 includes a pair of parallel straight portions 86, 86', joined at their ends by curved portions, such as portion 87. The inner track 85 corresponds in shape to the outer track 84 and includes a pair of straight portions 88, 88' which are joined at their ends by curved portions, such as curved portion 89. The tracks 84 and 85 are so constructed that there is a continuous slot or space between the outer edge of inner track 85 and the inner edge of outer track 84.

A plurality of evenly spaced container carrying discs 90 are slidably mounted on the tracks 84 and 85 and are connected through the continuous slot between the tracks 84, 85 to a continuous chain 91, the chain 91 being disposed below the continuous slot and supported by a pair of opposed sprockets, such as sprocket 92. The sprocket 92, in turn, is supported and driven by an upstanding shaft 93 which extends from the gears of a gear box 94 supported on platform 82. The gears of the gear box 94, in turn, are driven by a conveyor drive motor 95. The other sprocket (not shown) is an idler sprocket.

Each disc 90 is provided with a central pedestal 96 which, when a beaker 11 is arranged on disc 90, protrudes into a central probe receiving recess 97 in the container or beaker 11.

It is now seen that when motor 95 is energized, it drives, via the gears of gear box 94 and shaft 93, the sprocket 92 which, in turn, drives the continuous chain 91 in the direction indicated by the arrow 98 in FIG. 3.

Each beaker 11 is cylindrical and has a pick-up knob 100 which extends upwardly from the center of its top. As shown in FIG. 6, the pick-up knob 100 is a cylindrical, upstanding member of slightly less diameter than the diameter of bore 52 of the head 50. The knob 100 has a central waist portion 101 and is upwardly recessed adjacent the waist portion to provide, outwardly of waist portion 101 an annular shoulder 102.

When head 50 is positioned over the knob 100 of a beaker 11, the openings 63 are aligned with the waist portion 101 of the knob 100 and therefore when the hooks 64 move inwardly, they engage under the annular shoulder 102 so that the upstanding fingers 65 engage in the recess between waist portion 101 and annular shoulder 102. Hence, when head 50 engages knob 100 and the piston 47 is retracted, the weight of container 11 urges the knob 100 downwardly with respect to the hooks 64 and therefore the fingers 65 are essentially locked against inadvertent withdrawal, the hooks 64 being retractable only when the container or beaker 11 has been deposited on a surface and the weight relieved from the head 50.

Control mechanism

As best seen in FIG. 3, the platform 31 carries a fluid manifold 110 appropriately connected to a source of fluid under pressure, such as compressed air, by means of a supply conduit 111. There is also an exhaust conduit 112 connected to manifold 110, by means of which the compressed fluid is discharged from the manifold. Appropriate air lines (not shown) lead from the manifold 110 to the various cylinders 26, 41, 46 and 72. Further, appropriate cables in conduit 113 control the various solenoid actuated valves for operating the cylinders 26, 41, 46 and 72.

The control mechanism also includes various limit switches which determine the position of the various moving elements. Mounted at opposite ends of cylinder 46 are limit switches LS2 and LS3 which are adapted to be contacted by lug 69 when the piston rod 47 approaches its extreme positions, switch LS2 determining when the piston rod 47 is in it retracted position and switch LS3 determining when the piston rod 47 is in its extending position. Switches LS1 and LS4 are positioned on bottom 14 of housing 10, in a position to be contacted by a lug 120 carried by piston rod 28, the lug 120 contacting switch LS1 when the rod 28 is retracted and the door 16 is closed and, the lug 120 contacting switch LS4 when the piston rod 28 opens door 16 to its completely open position.

Switches LS5 and LS6 are positioned on slide block 39, the switch LS5 being engaged by a lug 121 on rack 38, when piston rod 40 is retracted, thereby indicating that the pick-up assembly is in the pick up zone over the conveyor, as shown in FIG. 2. Similarly, switch LS6 is adapted to be engaged by the lug 121 when the pick up assembly is pivoted to the depositing position over probe 24, as shown in FIGS. 1 and 3.

An electric eye system, best seen in FIG. 2, includes an electric eye assembly 122 supported at an appropriate height by means of a bracket 123 mounted in side 12. The light source or light 124, which shines as a beam of light on a photoelectric cell of assembly 122, is supported by an upstanding strap 125 in the central portion of the conveyor frame 80. The photoelectric cell 122 and its light source 124 are arranged to detect when a knob 100 passes therebetween and is in a position to be picked up by the head 50.

Electrical circuitry

Figure 7:
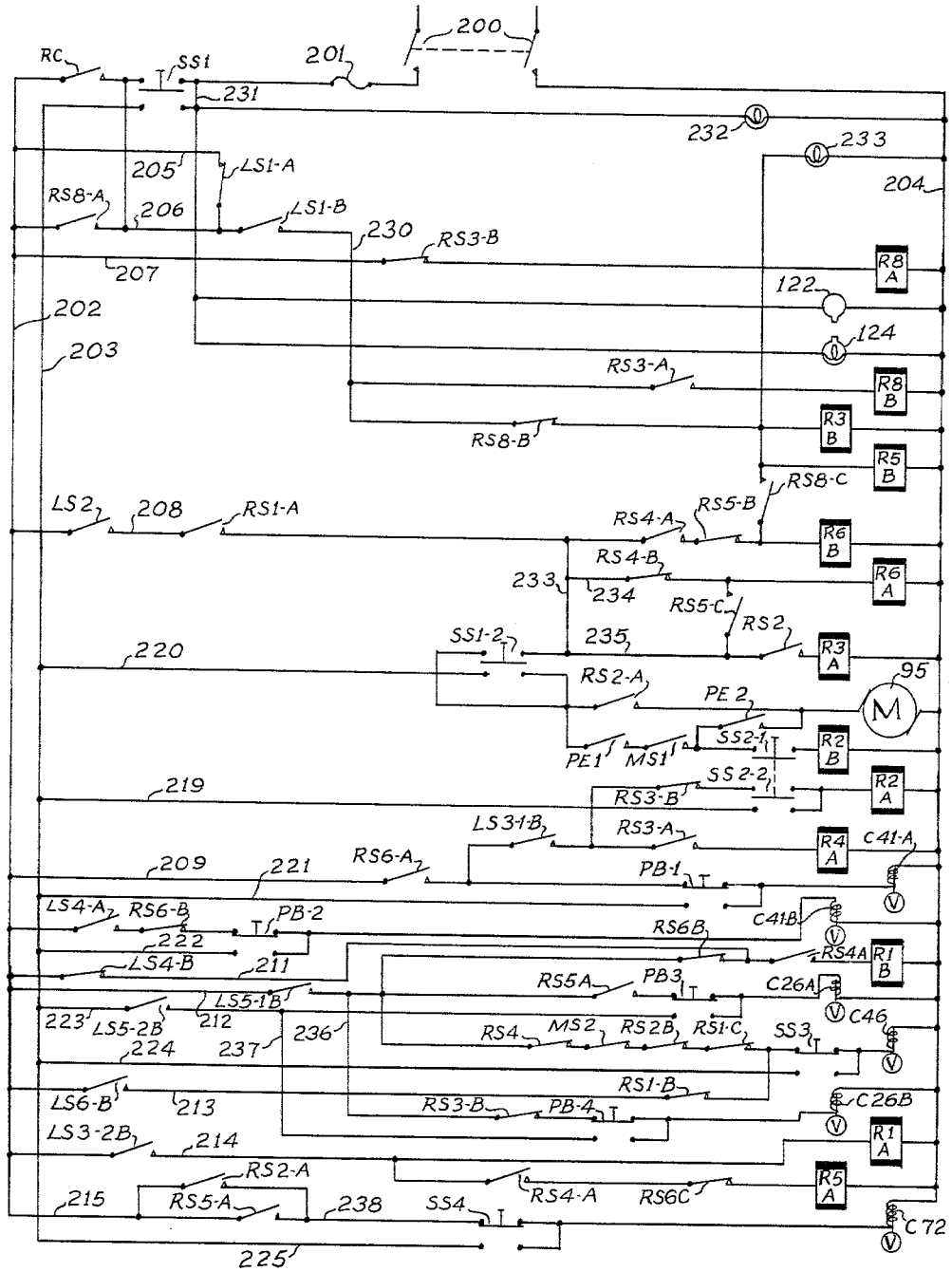
FIG. 7 is a schematic wiring diagram of the electrical system of the device shown in FIG. 1.

In the electrical circuit shown in FIG. 7, it is seen that current is supplied from a source of current to an on-off switch 200 and thence through a fuse 201 to a jog switch SS1–1 which is normally in an up position for feeding current to main bus 202 through a remote control, cycle start switch RC. A secondary bus 203 for supplying current to the manually operated auxiliary switches is connected to the other terminal of switch SS1–1, the switch SS1–1 being so arranged and constructed that it may selectively supply current to either bus 202 or bus 203. A ground bus or ground 204 provides a return back to the source of current, via switch 200.

In the following description, the various relays R1, R2, R3, R5, R6 and R8 hereinafter described are latching relays "A" and "B" coils. After receiving an impulse through one coil, the latching relays remain in one predetermined position until it receives a second impuse through another coil. Also, the limit switches LS1, LS3, LS4, LS5 and LS6 described above have a pair of switches associated therewith and hence these respective switches of the limit switches are designated as LS1A, LS1B, etc. Further, all relay switches are designated as "RS" followed by a numeral, which indicates the particular relay with which the switch is associated. The various switches are indicated, in FIG. 7, in their normal positions and hence whether a switch is normally open or closed is not stated.

Leading from bus 202 are a plurality of parallel wires designated by numerals 206 through 215 respectively. Leading from the secondary or auxiliary bus 203 are a plurality of similar parallel wires 219 through 225.

Switch LS1–A is parallel with switch RS through wire 205. Switches RS8–A and LS1–B are in series along wires 206 and 230, the wire 230 supplying current through switch RS3–A and relay coil R8B to ground 204 and also through switch RS8–B and relay coil R3B to ground.

Wire 207 supplies current via switch RS3–B and relay coil R8A to ground 204. Wire 208 supplies current through switches LS2, RS1–A, RS4–A, RS5–B, through the parallel connected relay coils R6B and R3B and red indicator light 233 to ground 204. Wire 231 connects in parallel green indicator light 232, light source 124, and the supply current for the electric eye assembly 122 across the line with respect to switch 200, the assembly 122 being adapted to close the switches PE1 and PE2, when light shining on the photoelectric cell assembly 122, the assembly 122 permitting the switches B1 and B2 to be open when the light beam is interrupted.

From the auxiliary bus, the wire 220 leads to one switch element of a selector switch SS1–2 while the other switch element of the selector SS1–2 is connected to wire 233 for selectively providing current to motor 95 through the parallel switch circuit, including switch RS2–A on one side and the series arranged switches PE1, MS1 and PE2 on the other side, switch MS1 being a motor starter switch. When the selector switch SS1–2 is up, current from wire 208 via switches LS2, RS1–A is supplied via wire 233 to the parallel switches leading to motor 95. From wire 233, wire 234 leads via switch RS4–B and relay coil R6A to ground 204. In parallel with switch RS4–B is switch RS5–C. Also leading from wire 233 is a wire 235 which supplies current via switch RS2 to relay coil R3A to ground bus 204.

A bush button selector switch SS2–1 is in series with relay coil R2B, supplies current from switch MS1 via relay coil R2B to ground bus 204. Selector switch SS2–1 is mechanically linked to a selector switch SS2–2 which, in one position, connects wire 219 through relay coil R2A to ground 204. In the other position of switch SS2–2, the relay coil R2A is connected to wire 209 via switch RS6–A, LS3–1B and relay switch RS3B. In parallel with the switches RS3B, SS2–2 and relay coil R2A is the relay coil R4A and its switch RS3A.

The wire 209, beyond switch RS6A, is also connected to one pole of a push-button selector switch PB1 and thence to a solenoid coil C41A which actuates the cylinder 41. With the push button switch PB1 in the other position, current is supplied via wire 221 to the coil C41A. With the coil C41A energized, the cylinder 41 moves the pick up arm assembly to a position over the conveyor. The cylinder 41 also has a coil C41B which, when energized, moves the pick up arm assembly over the probe 24. The coil C41B is selectively energized from the secondary bus 203 via wire 222 when push button switch PB2 is down or may be energized from main bus 202 via switches LS4–A and RS6–B, when push button switch PB2 is up.

The wire 211, when switch LS4–B is closed, supplies current from bus 202 via switch RS4–A and relay coil R1B to ground bus 204. Wire 212, via switch LS5–1B, supplies current simultaneously via relay RS6–B to switch RS4–A; via the series switches RS4, MS2, RS2–B and RS1–C to one switch element of selector switch SS3 and thence to coil C46 for actuating the valve of cylinder 46 to extend the piston rod 47; and through switches RS5–A and PB3 to coil C26A. When coil C46 is deenergized, the piston rod 47 is retracted. Wire 213 leads, via its series connected switches LS6–B and RS1–B to the same terminal of a selector switch SS3, providing an alternate path for the current. The other terminal of selector switch SS3 is connected to the secondary bus 203 via wire 224. When coil C26A is energized, it actuates the valve to cylinder 26 so as to close the door 16. The other terminal of push button PB3 is connected to wire 223 and limit switch LS5–2B to the secondary bus 203.

The other coil for actuating cylinder 26 to open the door 16 is coil C26B which is connected to wire 212 via wire 236, switch RS3B and push button PB4. The other terminal of push button PB4 is connected by wire 237 to wire 223 so that when switch LS5–2B is closed and push button PB4 is in down position, coil C26B may be energized.

Current from bus 202 is supplied via switch LS3–2B and wire 214 to relay R1A, the wire 214 also supplying current via switches LS3–2B, RS4A and RS6–B to relay R5A. From bus 202, the wire 215 supplies current to the parallel arranged switches RS2A and RS5A, a single wire 238 leading therefrom to switch SS4 and thence to solenoid C72. The wire 225 leading from bus 203 is connected to the other switch element of selector switch SS4 and provides an alternate source of current for the solenoid C72.

Operation

In operation, the closing of switch 200 supplies current to the selector switch SS1–1 which is normally in up position and hence energizes the main bus 202. Upon the momentary closing of switch RC the cycle of the machine is started. When the operation is commenced, current is supplied through wire 207 and switch RS3B to energize relay R8A and thereby close switches RS8–A and RS8–C while opening switch RS8–B. The closing of switch RS8–A bypasses switch RC. Also, current is supplied to switches LS5–1B, wire 212, wire 236 and switch RS3B and push button PB4 to energize coil C26B which causes the cylinder 26 to open the door 16 and shifting switches LS1–A and LS1–B to the position shown in FIG. 7. Therefore, switch LS1–A now bypasses current to bus 202.

As the piston 28 is extended, the lug 120 strikes switch LS4. The actuation of switch LS4 closes switch LS4A and opens switch LS4B. The closing of switch LS4A supplies current via switches RS6B and PB2 to energize coil 41B, thereby actuating the cylinder 41 to extend the piston rod 40. This, in turn, rotates, through the rack 38 and the pinion 37, the pick up arm assembly so as to position the head 50 over the probe 24. As the rack 38 approaches the limit of its travel to the left in FIG. 3, the lug 121 engages limit switch LS6. The engaging of switch LS6 closes switch LS6B and supplies current via wire 213 and switch RS1B and selector switch SS3 to energize coil C46 which in turn permits air to enter the cylinder 46 and extend the piston rod 47 so as to move the head 50 down onto the knob 100 of a beaker 11 mounted on the probe 24.

When the piston rod 47 is fully extended, the lug 69 strikes limit switch LS3. This causes switches LS3–1B and LS3–2B to be closed. The closing of switch LS3–2B energizes relay R1A. The energizing of relay coil R1A closes switch RS1–A and opens switch RS1–B and RS1–C. The opening of switch RS1–B breaks the circuit to coil C46 which in turn energizes the cylinder 46 to retract its piston rod 47. It will be observed in FIG. 6 that the weight of the collar 56 is suffiicent to urge the hooks 64 inwardly under normal conditions and hence when the head 50 is extended over the knob 100, the hooks 64 engage and hold the knob 100 so that as the cylinder 47 is retracted a beaker 11 on the probe 24 is lifted therefrom in a vertical path.

As the piston rod 47 is retracted, the lug 69 engages limit switch LS2 and disengages limit LS3. Thus, relay R1A is deenergized by the opening of switch LS3–2B; however, the switch RS1–A remains closed and switches RS1–B and RS1–C remain open. As the limit switch LS2 is closed, a circuit is made via wire 208, switch RS1–A, wire 233 and switch RS4–B to energize relay R6A. The energizing of relay R6A, in turn, closes switch RS6A and opens switch RS6B while opening switch RS6C. The opening of switch RS6C deenergizes the release relay R5B and therefore the container cannot be released by head 50 until relay R6B is energized. The opening of switch RS6B deenergizes the circuit including wire 210 to the coil C41B. The closing of switch RS6–A supplies current via wire 209 and push button PB1 to coil 41A which, in turn, actuates the cylinder 41 to retract the piston rod 40, thereby rotating the pick up assembly until it moves the container 11 carried by head 50 over to the pick up zone. As the pick up assembly approaches the pick up zone, the lug 121 engages switch LS5, thereby closing switches LS5–1B and LS5–2B. The closing of switch LS5–1B supplies current through relay RS6–B and closed relay switch RS4–A to relay coil R1B.

The actuation of relay coil R1B, in turn, returns relay switch RS1C to a closed position and hence supplies current to wire 212 via the normally closed switches RS4, MS2, RS2B and SS3 to the coil C46 which, in turn, actuates the air cylinder 46 to extend its piston rod 47, so as to deposit the container carried by head 50 on one of the discs 90. As the piston rod 47 becomes fully extended, the lug 69 again strikes the limit switch LS3, thereby again closing switch LS3–2B to again energize relay coil R1A. The energization of relay coil R1A shifts the switches RS1A, RS1B and RS1C.

The closing of switch LS3–1B (relay switch RS6–A having previously been closed by the actuation of relay R6A) supplies current to the relay coil R2A via switches RS3B and selector switch SS2–2. The energization of relay coil R2A closes switch RS2A and thereby supplies current via wire 215 and selector switch SS4 to coil C72, the coil C72 actuating cylinder 72 to raise its piston rod 71, thereby engaging the lug 69 so as to retract the hooks 64 and release the beaker 11. Relay coil R2A also opens relay switch RS2B and therefore breaks the circuit energizing coil C46 and hence the piston rod 47 is retracted. The retracting of the piston rod 47 causes lug 69 to disengage from switch LS3 and again engage the switch LS2.

It will be remembered that switch LS3–2B was closed momentarily when switch LS3 was engaged, and hence relay R1A was energized momentarily so as to close the relay switch RS1–A and open relay switch RS1–B; thus, the actuation of switch LS2 closes the switch LS2–B and supplies current via wire 208 and wires 233 and 235 and the switch RS2 which was closed upon the energization of relay coil R2A to energize relay R3A. Simultaneously therewith, current is supplied via selector switch SS1–2 from wire 233 via the switch RS2–A (which is now closed) to the motor 95. The energization of motor 95 closes switch MS1 and opens switch MS2, the latter switch preventing the extending of piston 47 until the motor is stopped, when the pick up assembly is over the conveyor.

Motor 95 continues to drive the conveyor until the knob 100 of a new beaker 11 breaks the light beam to the electric eye assembly 122, at which time the switches PE1 and PE2 are closed by the photoelectric cell assembly 122 so as to supply current from selector switch SS1–2, via switch MS1 and selector switch SS2–1 to energize relay R2B. The energization of relay R2B opens the switch RS2A and closes switch RS2B. The opening of switch RS2A would normally deenergize motor 95; however, the auxiliary circuit via the closed switches PE1, MS1 and PE2 continue to supply current to motor 95 until the light from the light source 124 again shines on the electric eye assembly 122, at which time the switches PE1 and PE2 are opened. At this time, the knob 100 of the particular beaker 11 have just passed the electric eye assembly 122 and is properly positioned beneath the pick up assembly.

The deenergization of motor 95 opens switch MS1 and again closes switch MS2; however, the momentary supplying of current through the circuit, including switches PB1 and MS1, supplies current via selector switch SS2–1 to momentarily energize relay coil R2B. The energization of relay coil R2B returns the switches RS2–A and RS2–B to their original position. The closing of switch RS2–B thus supplies current to again energize the coil C46 and cause the extending of the piston rod 47 until the head 50 surrounds the knob 100 of the new beaker 11. Since relay coil R2B was momentarily energized, the switch RS2A has been opened, deenergizing the coil C72 so as to cause the cylinder 72 to retract the piston 71. Thus, when the head 50 passes over the knob 100, the hooks 64 are in a position to pick up the knob 100 as the head 50 passes over that knob 100.

The extending of piston rod 47 causes lug 69 to again engage the limit switch LS3, causing the closing of switches LS3–1B and LS3–2B. The switch LS1–2B energizes relay coil R1A which again closes the switch RS1A while opening the switches RS1B and RS1C. This deenergizes the circuits to the coil C46 to prevent any further energization at this particular time.

The deenergization of coil C46 permits the piston rod 47 to be retracted, until the lug 69 strikes and actuates switch LS2 which closes switch LS2B. At this time, however, coil R3A has opened switch R3B and closed switch R3A to energize coil R8–B and hence open switch RS8–C. Also, since switch RS1A is closed and switch RS4A is closed (the relay coil R4A having been the last energized relay coil for relay R4), current is supplied via relay switch RS5B to relay R6B. The energization of relay R6B causes switches R6A and R6B to be returned to their original position, thereby providing a circuit through wire 210 to coil C41B, provided switch LS4A is closed (indicating that the door 16 is opened).

The closing of switch LS2 makes a circuit via switches RS1A, RS4A, RS5B to relay coil R6B which returns the switches R6A and R6B to their original positions. Thus, with the door 16 open and the switch LS4A closed to indicate that the door is open, a circuit is made via wire 210 to coil C41B which causes the cylinder 41 to extend the piston 40 so that the arm assembly is rotated again over the probe 24. As the pick up assembly approaches the position over the probe, the switch LS5 is actuated, closing switch LS5–1A and thereby providing current through switches RS4, MS2, RS2B, RS1C, to energize coil C46 and thereby cause the extending of piston rod 47. Thus, when the container 11 is placed on the probe, switch LS3 is actuated, closing switch LS3–1B and LS3–2B. With switch LS3–2B closed and the relay coil R4A having been energized, a circuit is made via relay switch RS6C, relay coil R6A is energized, thereby closing relay switch RS5A to make a circuit to the release coil C72. Relay switch RS5B is opened by this procedure so as to deenergize relay coil R6B. Further, the relay switch RS5C is closed and hence a circuit is made via wire 235 to energize relay coil R6A. A circuit is also made via switch RS2 to relay coil R3A which opens switch RS3B and closes switch RS3A thereby making a circuit to the coil C26A for closing the door 16. The closing of door 16 causes the opening of switch LS1–A and the closing of switch LS1–B, thereby rendering the system responsive to the switch RC for commencing another cycle.

It will also be understood that when switch SS1–1 is shifted for supplying current to bar 203, the individual actuation of the selector switches or push buttons will individually actuate the various moving components.

It will be obvious to those skilled in the art that many variations may be made in the embodiment here chosen for the purpose of illustrating the present invention without departing from the scope thereof as defined by the appended claims.

I claim:

1. In an article transfer device, a conveyor, an arm over said conveyor, sensing means for sensing when an article is in a predetermined position on said conveyor, actuating means for actuating said conveyor, said actuating means being responsive to said sensing means for stopping said conveyor when an article actuates said sensing means, means automatically actuated when said conveyor is stopped for actuating said arm to lift the article from said conveyor and deposit it at a position away from said conveyor, and means for actuating said arm to reengage the deposited article and return it to said conveyor.

2. The structure defined in claim 1 including means for pivoting said arm and means for releasing said article from said arm when said arm has been pivoted to a predetermined position.

3. The structure defined in claim 2 including pick up means on said arm for moving in a vertical path for engaging and lifting said article from said conveyor when said arm is over said conveyor and said pick up means is extended.

4. An article transfer device for operation with a housing having a pivotally mounted door comprising a pick up assembly mounted on said housing and a conveyor adjacent one of the sides of said housing, said conveyor being adapted to convey articles successively to a pick up zone, said door being provided with a depositing zone, said pick up assembly including an arm pivotally mounted on said housing for moving in an arcuate path from over said pick up zone to over said depositing zone, an extensible rod on said arm, a pick up head on said rod, and means for extending said rod in both positions of said arm whereby articles may be selectively transferred from said conveyor to said depositing zone and from said depositing zone to said conveyor.

5. The structure defined in claim 4 including means synchronized with the actuation of said arm for closing and opening said door during each cycle of said device.

6. The structure defined in claim 4 including means for actuating said arm and said conveyor for positioning successive articles on said conveyor in said pick up zone and for actuating said arm and said rod after each article is so positioned whereby said head is caused to pick up each article and transfer the same to the depositing zone, and means for preventing the depositing of said articles in said depositing zone unless said door is opened.

7. The structure defined in claim 4 wherein said head includes a body having a downwardly opening bore, a plurality of arms extending through said body for engaging the upper end of an article, and means movable in an axial direction with respect to said rod for actuating said arms.

References Cited by the Examiner
UNITED STATES PATENTS

| | | | |
|---|---|---|---|
| 687,165 | 11/1901 | Quinby | 294—115 |
| 2,691,472 | 10/1954 | Weimer. | |
| 2,773,582 | 12/1956 | Denyssen | 198—20 |
| 3,031,906 | 5/1962 | Holman. | |

SAMUEL F. COLEMAN, *Primary Examiner.*

WILLIAM B. LA BORDE, ERNEST A. FALLER,
*Examiners.*